United States Patent [19]

Floreancig

[11] Patent Number: 4,585,626
[45] Date of Patent: Apr. 29, 1986

[54] PROCESS FOR MAKING INTO USEFUL PRODUCTS THE URANIUM AND RARE EARTHS CONTAINED IN IMPURE UF$_4$ RESULTING FROM THE EXTRACTION OF URANIUM FROM PHOSPHORIC ACID

[75] Inventor: Antoine Floreancig, St. Genis Laval, France

[73] Assignee: Uranium Pechiney Ugine Kuhlmann, Paris, France

[21] Appl. No.: 516,965

[22] Filed: Jul. 25, 1983

[30] Foreign Application Priority Data

Aug. 12, 1982 [FR] France ............................... 82 14353

[51] Int. Cl.$^4$ ............................................ C01F 13/00
[52] U.S. Cl. .......................................... 423/2; 423/10
[58] Field of Search ....................................... 423/2, 10

[56] References Cited

U.S. PATENT DOCUMENTS

| | | | |
|---|---|---|---|
| 2,866,680 | 12/1958 | Long ........................................ | 423/7 |
| 3,925,536 | 12/1975 | Schuman ................................. | 423/2 |
| 4,461,747 | 7/1984 | Fitoussi et al. ......................... | 423/2 |
| 4,478,804 | 10/1984 | Watanabe et al. ..................... | 423/10 |

*Primary Examiner*—Maurice J. Welsh
*Attorney, Agent, or Firm*—McDougall, Hersh & Scott

[57] ABSTRACT

A process for making into useful products the uranium and rare earths contained in impure uranium tetrafluoride resulting from the recovery of uranium from phosphoric acid, comprising dissolving it in a hot condition in a nitric medium in the presence of an aluminum compound, treating the resulting solution with a solvent for extracting uranyl nitrate, which contains a phosphoric ester, and separating from the aqueous phase from which the uranium is removed, the solvent which is charged with uranyl nitrate to be made into a useful product, which provides that, in order to achieve easy separation of the aqueous phase from which the uranium has been removed, from the uranyl nitrate extraction solvent:

(a) The operation of dissolution of UF$_4$ is carried out in two steps at a suitable temperature, the first step comprising introducing insufficient amounts of nitric acid and the aluminum compound for complete dissolution of the impure uranium tetrafluoride and keeping the resulting suspension in an agitated condition for a period of time of at least 0.5 hour, and the second step comprising introducing amounts of nitric acid and the aluminum compound, which are at least sufficient to put into solution the uranium which was not dissolved in the first step, and while maintaining the suspension in an agitated condition; and (b) the uranyl nitrate is extracted by bringing into contact the aqueous medium resulting from the dissolution of UF$_4$ and the uranyl nitrate extraction solvent containing the phosphoric ester.

22 Claims, No Drawings

PROCESS FOR MAKING INTO USEFUL PRODUCTS THE URANIUM AND RARE EARTHS CONTAINED IN IMPURE UF₄ RESULTING FROM THE EXTRACTION OF URANIUM FROM PHOSPHORIC ACID

The present invention concerns a process for making into useful products the uranium and rare earths contained in impure uranium tetrafluoride resulting from the recovery of uranium from phosphoric acid, which comprises dissolving the impure uranium tetrafluoride, in two steps, by means of a solution of nitric acid in the presence of an aluminium compound, then extracting the uranyl nitrate by bringing into contact the aqueous medium resulting from the dissolution of $UF_4$ and an extraction solvent containing a phosphoric ester.

It has already long been known to use an organic solvent containing a phosphoric ester to extract uranyl nitrate from an impure solution containing same. Thus for example U.S. Pat. Nos. 2,848,300 and 2,979,379 describe such processes which comprise extracting uranyl nitrate, in stages, by means of tributyl phosphate contained in an organic solvent.

However, when such a process is applied to the extraction of the uranyl nitrate produced by dissolution of an impure $UF_4$ by means of nitric acid and a complexing agent in respect of the fluoride ions formed by a compound of aluminium, it is found that, when the extracting organic phase and the inorganic phase to be extracted are brought into contact, a stable emulsion is formed, which prevents easy recovery of the uranyl nitrate-charged organic phase.

The applicants, having repeatedly encountered that difficulty, after dissolving $UF_4$ by means of nitric acid in the presence of an aluminium compound, as is described in French Pat. No. 2 429 746, continued their research and found that separation after contact of the organic and aqueous phases was made easy when the operation of acid dissolution of $UF_4$ was carried out in two steps.

The process according to the invention for making into useful products the uranium and rare earths contained in an impure uranium tetrafluoride, comprising dissolving same in a hot condition in a nitric medium in the presence of an aluminium compound and using an organic extraction solvent containing a phosphoric ester, is characterised in that:

(a) the operation of dissolution of $UF_4$ is carried out in two steps at a suitable temperature, the first step comprising introducing insufficient amounts of nitric acid and the aluminium compound for complete dissolution of the impure uranium tetrafluoride and keeping the resulting suspension in an agitated condition for a period of time of at least 0.5 hour, and the second step comprising introducing amounts of nitric acid and the aluminium compound, which are at least sufficient to put into solution the uranium which was not dissolved in the first step, and while maintaining the suspension in an agitated condition; and (b) the uranyl nitrate is extracted by bringing into contact the aqueous medium resulting from the dissolution of $UF_4$ and the uranyl nitrate extraction solvent containing the phosphoric ester.

In accordance with the process of the invention, the treated uranium tetrafluoride results from the recovery of uranium from phosphoric acid by extraction by means of a suitable solvent and re-extraction of the uranium by means of hydrofluoric acid, as described for example in U.S. Pat. No. 2,866,680 which recommends using octylpyrophosphoric acid as the uranium extraction solvent.

As already stated above, in pursuing their research, the applicants, wishing to extract the uranyl nitrate resulting from dissolution of impure uranium tetrafluoride, tried to apply the known process for extracting uranyl nitrate by means of an organic solvent containing a phosphoric ester, but they were confronted with the formation of a stable emulsion, which does not permit the uranyl nitrate to be recovered.

Faced with that difficulty, the applicants sought to achieve the conditions specified by the known process, without ever arriving at the creation of an easily separable emulsion. Then, having continued their research, the applicants found that the creation of an easily separable emulsion, which is produced by bringing into contact the aqueous phase containing the uranyl nitrate and the organic solvent containing a phosphoric ester, was closely linked to the conditions in respect of dissolution of the $UF_4$ used, which conditions comprise treating the impure $UF_4$ in a hot condition in two steps by means of nitric acid and an aluminium compound.

In accordance with the process of the invention, the combined amount of the aluminium compound, in the two steps, for complexing the fluorine from the $UF_4$, must be at least equal to the stoichiometric amount corresponding to the formation of $AlF_6^{3-}$ and preferably between 1.15 and 1.50 stoichiometry.

The combined amount in the two steps of the nitric acid required for dissolution of the impure $UF_4$ is such that the free acidity at the discharge of the second step must be at least 0.5 mol of $HNO_3$ per liter of solution and preferably from 1 to 5 mols per liter of solution.

The amount of aluminium compound introduced when carrying the second step into effect is at most equal to 0.95 times the stoichiometric amount corresponding to the formation of $AlF_6^{3-}$ for the fluorine involved, but is preferably selected to fall in the range of from 0.60 to 0.90 times said stoichiometric amount.

The amount of nitric acid introduced in carrying the first step into effect is at most equal to 0.9 times the combined amount of nitric acid for solubilising the uranium of $UF_4$ and preferably from 0.5 to 0.75 times said combined amount.

The temperature required for putting the $UF_4$ into solution is selected, in the two steps, in the range of from 60° C. to 110° C. and preferably in the range of from 70° C. to 90° C.

The agitation time, when carrying the first step into effect, is so selected that the particles of hydrated aluminium fluoride can attain a sufficient size. That period of time which must be at least thirty minutes is generally selected to be between one hour and twelve hours and preferably between one hour and five hours.

The agitation time, in carrying the second step into effect, has less influence on separation of the liquid phases in extracting the uranyl nitrate, but it must be sufficient to permit solubilisation of the uranium. For that purpose, it is generally between 0.5 hour and twelve hours and preferably between one and five hours.

The aluminium compound used for complexing the fluoride ions resulting from uranium tetrafluoride is generally selected from the group comprising aluminium chloride, aluminium nitrate, alumina, aluminium hydroxide and aluminium sulphate as well as the compounds of aluminium which are capable of forming a soluble complex of aluminium fluoride. In practice, in most cases, the aluminium compound is alumina or aluminium hydroxide, those two substances being the substances which are most widely available on an industrial scale.

When dissolution of $UF_4$ in two steps is completed, the resulting aqueous medium is generally cooled to a temperature of from 20° to 80° C. and preferably from 30° to 60° C.

The cooled aqueous medium is then brought into contact with a uranyl nitrate extraction solvent.

In accordance with one alternative form, the aqueous medium resulting from the dissolution of $UF_4$ is subjected to separation by filtration of the solid and liquid phases before being brought into contact with the uranyl nitrate extraction solvent.

The uranyl nitrate extraction solvent is a solution of phosphoric ester in a hydrocarbon, in a proportion of from 20 to 50% but preferably from 30 to 40% by volume.

The phosphoric ester is preferably tributyl phosphate.

The hydrocarbon used is preferably selected from the group comprising hexane, dodecane and kerosines resulting from petroleum distillation cuts.

The operation of bringing into contact the aqueous medium containing the uranyl nitrate and the extraction solvent is preferably effected in a counter-flow mode in order to achieve a high level of efficiency in regard to extraction of the uranyl nitrate and better separation of the nitrate and the rare earths.

After separation, the extraction solvent containing the uranyl nitrate is then treated with water or an aqueous solution containing a small amount of nitric acid, for extracting the uranyl nitrate.

The aqueous medium from which the uranium has been removed and which contains the rare earths is treated by means of an alkaline agent, to cause precipitation thereof.

In consequence, and in accordance with the invention, that procedure results in a solid concentrate of rare earths which can be made into a useful product, using known methods.

The invention will be better appreciated by means of the following examples which are given by way of illustration.

EXAMPLE 1

This example illustrates a process for extracting uranyl nitrate, in accordance with the prior art, comprising single-stage dissolution of impure uranium tetrafluoride by means of nitric acid in the presence of $Al_2O_3, 3H_2O$, then extraction of the resulting medium by a solution of tributyl phosphate in dodecane.

That procedure involved treating 100 kg of impure $UF_4$ resulting from the recovery of uranium from phosphoric acid by means of octylpyrophosphoric acid, re-extraction of which was effected by means of hydrofluoric acid.

The undried impure uranium tetrafluoride was of the following composition, in percent by weight:

| | |
|---|---|
| Uranium | 16.3% |
| Bound fluorine | 9.5% |
| Iron | 0.5% |
| Calcium | 0.5% |
| Phosphorus | 0.1% |
| Free HF | 7.9% |

-continued

| | |
|---|---|
| Yttrium | 1.9% |
| Thorium | 0.9% |
| Rare earths | 1.6% |
| Moisture and various | 60.8% |

That amount of $UF_4$ was placed in a reactor and then treated at a temperature of 90° C. for a period of 5 hours by means of commercial nitric acid containing 55% of $HNO_3$ and $Al_2O_3, 3H_2O$. The amount of alumina used was 1.25 times the stoichiometric amount corresponding to the formation of $AlF_6^{3-}$ and the amount of nitric acid was 6 mols of nitric acid per mol of alumina introduced. Under those conditions, the free acidity at the end of the reaction was 2.6 mols of $HNO_3$ per liter.

The procedure then involved counter-flow treatment of the aqueous medium resulting from the dissolution of $UF_4$ in a battery of four mixer-settlers by means of an extraction solvent formed by 30% by volume of tributyl phosphate in dodecane. That then produced a highly stable emulsion, which required working with very low flow rates in respect of the medium to be extracted and the extraction solvent, of the order of 0.9 liter per hour for the aqueous medium containing the uranyl nitrate, and of the order of 1.5 liters per hour for the extraction solvent, representing a combined specific flow rate of 0.3 cubic meters per hour and per square meter of settler.

EXAMPLE 2

This Example illustrates the process for extracting uranyl nitrate, in accordance with the invention, comprising two-step dissolution of the same uranium tetrafluoride as that used in Example 1, followed by extraction of uranyl nitrate by means of the same solvent as that used in that Example.

The two-step dissolution operation was carried out in the following manner:

in a first dissolution step, 100 kg of impure $UF_4$ was introduced into the same reactor as in Example 1, with an amount of alumina equal to 0.8 times the stoichiometric amount corresponding to the formation of $AlF_6^{3-}$ and an amount of nitric acid corresponding to 6 mols of acid per mol of alumina introduced. The reaction medium was maintained in an agitated condition for 3 hours at a temperature of 90° C.;

in the second dissolution step, an amount of alumina equal to 0.45 times the stoichiometric amount corresponding to the formation of $AlF_6^{3-}$ and an amount of nitric acid equal to 6 mols of acid per mol of alumina introduced in the second step was introduced into the reactor. The reaction medium was maintained in an agitated condition at a temperature of 90° C. for 2 hours. The free acidity at the end of the reaction was 2.55 mols of nitric acid per liter.

Operation then comprised counter-flow treatment of the aqueous medium resulting from the dissolution of $UF_4$ in the same battery of four mixer-settlers as that used in Example 1, by means of an extraction solvent formed by 30% by volume of tributyl phosphate in dodecane. That then resulted in a low-stability emulsion, which made it possible, with all other conditions being identical to those set forth in Example 1, to operate with flow rates in respect of the medium to be extracted and the extraction solvent, of the order of 8 liters per hour, for the aqueous medium containing the uranyl nitrate, and of the order of 13.5 liters per hour for the extraction solvent, representing a combined specific flow rate of 2.7 cubic meters per hour and per square meter of settler.

In accordance with the process of the invention, and in comparison with Example 1, it appears that the same solvent extraction apparatus has a treatment capacity which is improved in a ratio of 9/1.

The extraction solvent, charged with uranyl nitrate, which was easily separated, was subjected to counterflow treatment by means of 15 liters per hour of a slightly acidified aqueous solution containing 0.01 mol of HNO₃ per liter, in a battery comprising six mixer-settlers. That produced a purified solution of uranyl nitrate containing less than 1000 ppm of rare earths, with respect to the uranium content.

The aqueous medium from which the uranium was removed was treated with lime with a pH-value of 7, which caused virtually complete precipitation of the rare earths and impurities. Separation of the precipitate resulted in concentrate of rare earths to be put into the form of a useful product.

I claim:

1. A process for making into useful products the uranium and rare earths contained in impure uranium tetrafluoride resulting from the recovery of uranium from phosphoric acid, comprising dissolving said uranium tetrafluoride in a hot condition in a nitric solution with a phosphoric ester-containing solvent for extracting uranyl nitrate, and separating from the aqueous phase from which the uranium is removed, the solvent which is charged with uranyl nitrate to be made into a useful product, characterised by, in order to achieve easy separation of the aqueous phase from which the uranium has been removed, from the uranyl nitrate extraction solvent:

(a) dissolving UF₄ in two steps at a suitable temperature, the first step comprising introducing insufficient amounts of nitric acid and the aluminum compound for complete dissolution of the impure uranium tetrafluoride and keeping the resulting suspension in an agitated condition for a period of time of at least 0.5 hour, and the second step comprising introducing amounts of nitric acide and the aluminum compound, which are at least sufficient to put into solution the uranium which was not dissolved in the first step, and while maintaining the suspension in an agitated condition; and (b) extracting the uranyl nitrate by bringing into contact the aqueous medium resulting from the dissolution of UF₄ and the uranyl nitrate extraction solvent containing the phosphoric ester.

2. A process for making uranium and rare earths into a useful product, according to claim 1, characterised by subjecting to a separation operation the aqueous medium resulting from the dissolution of UF₄ in two steps before effecting solvent extraction of the uranyl nitrate.

3. A process for making uranium and rare earths into a useful product, according to either one of claims 1 or 2, characterised in that the combined amount of the aluminium compound in the two dissolution steps is at least equal to the stoichiometry corresponding to the formation of $AlF_6^{3-}$ and preferably from 1.15 to 1.50 times said stoichiometry.

4. A process for making uranium and rare earths into a useful product, according to claim 1, characterised in that the combined amount of nitric acid required for two-step dissolution of the impure UF₄ is such that the free acidity, at the discharge from the second step, is at least 0.5 mole of HNO₃ per liter of solution and preferably between one and five moles per liter of solution.

5. A process for making uranium and rare earths into useful product, according to claim 1, characterised in that the amount of aluminium compound in the first dissolution step is at most equal to 0.95 times the stoichiometric amount corresponding to the formation of $AlF_6^{3-}$ and preferably is so selected as to fall in the range of from 0.60 to 0.90 times said stoichiometric amount.

6. A process for making uranium and rare earths into a useful product, according to claim 1 characterised in that the amount of nitric acid in the first dissolution step is at most equal to 0.9 times the combined amount of nitric acid for solubilising the uranium.

7. A process for making uranium and rare earths into a useful product, according to claim 1 characterised in that the UF₄ dissolution temperature is between 60° C. and 110° C.

8. A process for making uranium and rare earths into a useful product, according to claim 1 characterised in that the agitation period in carrying out the first dissolution step is between 1 hour and 12 hours.

9. A process for making uranium and rare earths into a useful product, according to claim 1 characterised in that the agitation time in carrying out the second dissolution step is between 0.5 hour and 12 hours.

10. A process for making uranium and rare earths into a useful product, according to claim 1 characterised in that the aluminium compound is preferably selected from the group comprising aluminium chloride, aluminium nitrate, aluminium sulphate, alumina and aluminium hydroxide.

11. A process for making uranium and rare earths into a useful product, according to claim 1 characterised by the additional step of cooling the aqueous medium resulting from the two-step dissolution operation at a temperature of from 20° C. to 80° C.

12. A process for making uranium and rare earths into a useful product, according to claim 1, characterised in that the phosphoric ester contained in the uranyl nitrate extraction solvent is tributyl phosphate.

13. A process for making uranium and rare earths into a useful product, according to claims 1 or 12, characterised in that the phosphoric acid is put into solution in a hydrocarbon belonging to the group comprising hexane, dodecane and kerosines, resulting from petroleum distillation cuts.

14. A process for making uranium and rare earths into a useful product, according to claim 1, characterised in that the extraction solvent contain from 20 to 50% by volume of phosphoric ester in a hydrocarbon.

15. A process for making uranium and rare earths into a useful product, according to claim 1 characterised by the additional step of re-extracting the uranyl nitrate contained in the extraction solvent by means of a weakly acid aqueous solution.

16. A process for making uranium and rare earths into a useful product, according to claim 1 characterised by the additional step of precipitating the rare earths from the aqueous medium from which the uranium has been removed, by means of an alkaline agent.

17. A process for making the uranium and rare earths into a useful product, according to claim 1, characterised in that the amount of nitric acid is from 0.5 to 0.75 times the combined amount of nitric acid for solubilizing the uranium.

18. A process for making the uranium and rare earths into a useful product, according to claim 1, characterised in that the dissolution temperature is between 70° C. and 90° C.

19. A process for making the uranium and rare earths into a useful product, according to claim 1, characterised in that the agitation period in carrying out the first dissolution step is between 1.0 and 5.0 hours.

20. A process for making the uranium and rare earths into a useful product, according to claim 1, characterised in that the agitation time in carrying out the second dissolution step is between 1.0 hour and 5.0 hours.

21. A process for making the uranium and rare earths into a useful product, according to claim 1, characterised by the additional step of cooling the aqueous medium at a temperature of from 30° C. to 60° C.

22. A process for making the uranium and rare earths into a useful product, according to claim 1, characterised in that the extraction solvent contains from 30 to 40 percent by volume of phosphoric acid.

* * * * *